United States Patent [19]

Rose

[11] 4,418,814
[45] Dec. 6, 1983

[54] FINGER COOKIE ORIENTING APPARATUS

[75] Inventor: Edward Rose, Skokie, Ill.

[73] Assignee: Peters Machinery Company, Subsidiary of Katy Industries, Inc., Chicago, Ill.

[21] Appl. No.: 236,636

[22] Filed: Feb. 20, 1981

[51] Int. Cl.³ .............................................. B65G 47/24
[52] U.S. Cl. ..................................... 198/406; 198/424
[58] Field of Search ....................... 198/406, 409, 424; 193/45, 47, 48; 53/248, 253

[56] References Cited

U.S. PATENT DOCUMENTS

| 1,279,562 | 6/1918 | Lowell | 53/542 |
|---|---|---|---|
| 1,826,379 | 10/1931 | Birkmeyer | 198/406 |
| 2,609,944 | 9/1952 | Nicoletti | 198/406 |
| 2,656,656 | 10/1953 | Murdoch et al. | 53/494 |
| 2,755,907 | 7/1956 | McCullough et al. | 198/408 |
| 2,828,592 | 4/1958 | Bergsland | 53/253 |
| 2,936,557 | 5/1960 | Fay | 53/542 |
| 3,073,429 | 1/1963 | Anderson | 198/406 |
| 3,084,783 | 4/1963 | Morton et al. | 198/450 |
| 3,290,859 | 12/1966 | Talbot | 53/534 |
| 4,056,187 | 1/1977 | Ajero | 193/48 |
| 4,156,335 | 5/1979 | Strobl | 198/406 |
| 4,226,073 | 10/1980 | Rose et al. | 53/532 |

FOREIGN PATENT DOCUMENTS 618329 7/1978 U.S.S.R. ........................... 198/406

Primary Examiner—Jeffrey V. Nase
Assistant Examiner—Dennis J. Williamson
Attorney, Agent, or Firm—Hill, Van Santen, Steadman & Simpson

[57] ABSTRACT

Orienting apparatus for elongated finger cookies or other elongated bakery products supplied in uniform groups. The finger cookies are supplied to the orienting apparatus in upright conditions and are then laid flat on a packaging conveyor. Usually, the groups of cookies are supplied in two rows in side by side relation relative to each other with groups in each row of uniform count and conveyed along drop gate members in upright positions to a dropping station, where the drop gate members are swung from supporting engagement with a group of cookies conveyed and accommodate the group of cookies to drop through a drop chute assembly in their upright positions and then are turned at 90° and laid onto a conveyor plate along which the oriented groups of cookies are conveyed in a flat condition to a loading station for packaging or wrapping.

12 Claims, 5 Drawing Figures

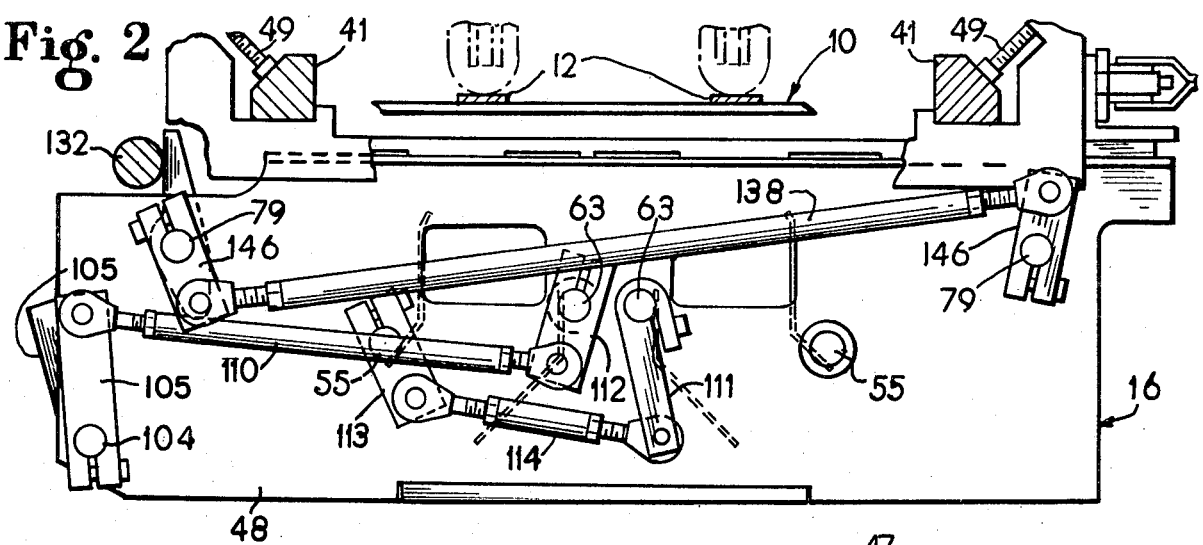
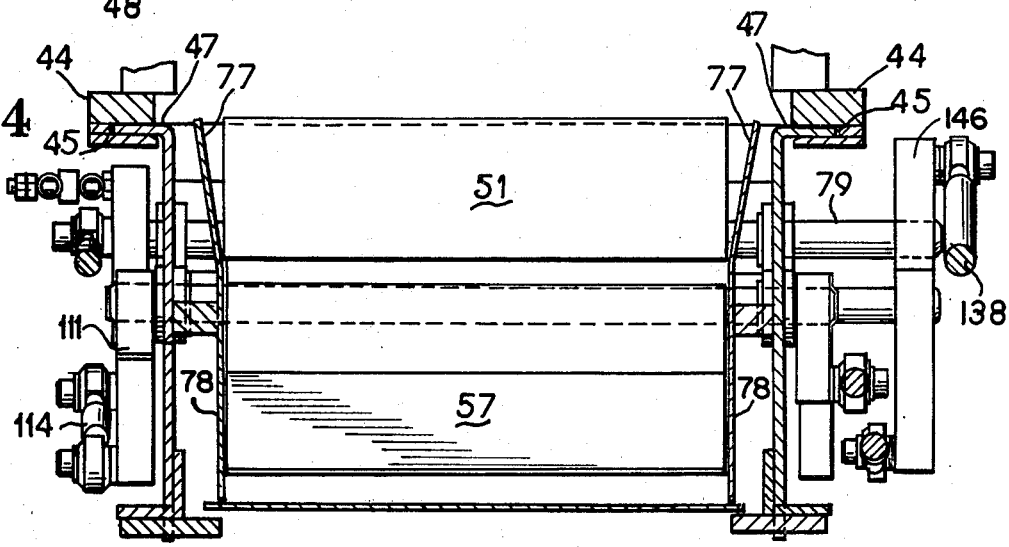
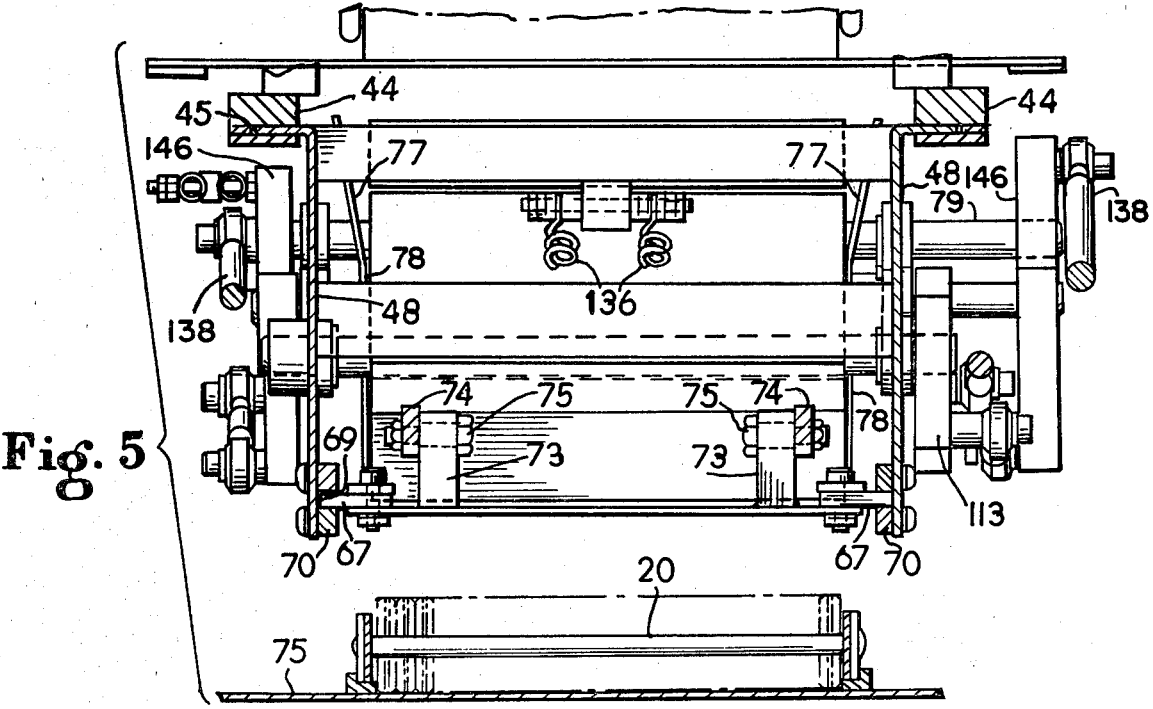

FINGER COOKIE ORIENTING APPARATUS

BACKGROUND OF THE INVENTION

This invention is directed to an apparatus for automatically orienting finger cookies or other similar shaped bakery goods supplied in an upright condition and turning the groups of cookies flat and depositing them onto a conveyor for packaging or other forms of wrapping.

U.S. Pat. No. 3,290,859 dated Dec. 13, 1966 and entitled "Tray Loader" discloses what is now a commercial form of tray loader, which has been extremely efficient in loading round cookies or cookies of other similar shapes.

U.S. Pat. No. 4,226,073 dated Oct. 7, 1980 discloses another form of commercial and successful apparatus for tray loading rectangular cookies, which cannot be loaded by the apparatus described in U.S. Pat. No. 3,290,859 without the danger of damaging the cookies as dropped at the drop station. The loading apparatus of U.S. Pat. No. 4,226,073 is also designed to prevent chute "jam-up" when the apparatus is loading square cookies which prevents the breakage or waste of the cookies and efficiently loads square cookies or other cookies of like shapes for loading onto trays.

The apparatus of the present invention differ from those briefly discussed in that it is particularly adapted for orienting counted groups of bakery products, such as finger cookies and like elongated fragile articles for deposit on their sides onto a wrapping conveyor in a sequential orderly manner and prevent crumbling or damage to the products.

SUMMARY OF THE INVENTION

An automatic orienting apparatus for sandwiched finger cookies or like bakery products supplied in an upright condition in groups of uniform count and usually in two parallel rows to an orienting station. A pair of parallel drop chutes are located in cookie receiving relation with respect to the two rows. Each drop chute is located in cookie receiving relation with respect to the two parallel rows of cookies and has a width and length sufficient to receive a cookie group of a predetermined count. Separate drop gates support the cookie groups in side by side relation as moving above the drop chutes, and when activated drop the cookies straight downward into the drop chutes, arranged to orient the cookies from upright positions to positions at 90° with respect to their position when initially dropped, and then depositing the cookies onto a conveyor, carrying the oriented groups of cookies or other groups of bakery products for packaging in groups.

It will be readily apparent from the drawings and description that the apparatus may orient and load various forms of cookies or other bakery products and that the invention should not be limited to the orienting of any particular form of product.

One of the advantages of the invention is that a plurality of elongated bakery products may be oriented into a position for loading with little if any liability of damaging the products.

Another advantage of the invention is that uniform groups of bakery products coverage in one position may be oriented into a position for high speed packaging in groups, by a simple and effective form of drop chute and orienting mechanism arranged to break the fall of the products and easily turn the products ninety degrees in position for loading in groups.

A further advantage of the invention is in the provision orienting chutes for bakery products, turning side by side groups bakery products ninety degrees and releasing the groups of bakery products for packaging, with little if any crumbling of the products.

Another advantage of the invention is that elongated bakery products, such as finger cookies, may readily be oriented for packaging, with a minimum of faulty orienting as the groups of cookies are turned ninety degrees and positioned to be carried away by a conveyor in counted groups for packaging.

Another advantage and object of the invention is in the provision of a simplified and effective form of drop chute and movable orienting walls therefore, operable to easily turn the groups of cookies ninety degrees from the position dropped in which the orienting operation also softens the dropping of the groups of cookies.

A further advantage and object of the invention is to provide a novel and improved form of bakery article orienting apparatus in which pairs of parallel bakery article groups are oriented in two sequential phases of a drop cycle and are then deposited onto a conveyor for packaging with no faulty orienting or damage to the bakery articles.

These and other objects, features and advantages of the invention will become apparent from time to time from the following description of the preferred embodiment thereof taken in conjunction with the accompanying drawings.

BRIEF DESCRIPTION OF THE DRAWINGS

FIG. 2 is a fragmentary sectional view of the apparatus through the loading station, showing certain details of the operating mechanism for the orienting chutes, not shown in FIG. 1.

FIG. 4 is a sectional view taken substantially along line IV—IV of FIG. 3, and

FIG. 5 is a sectional view taken substantially along line V—V of FIG. 3.

Figure 1:
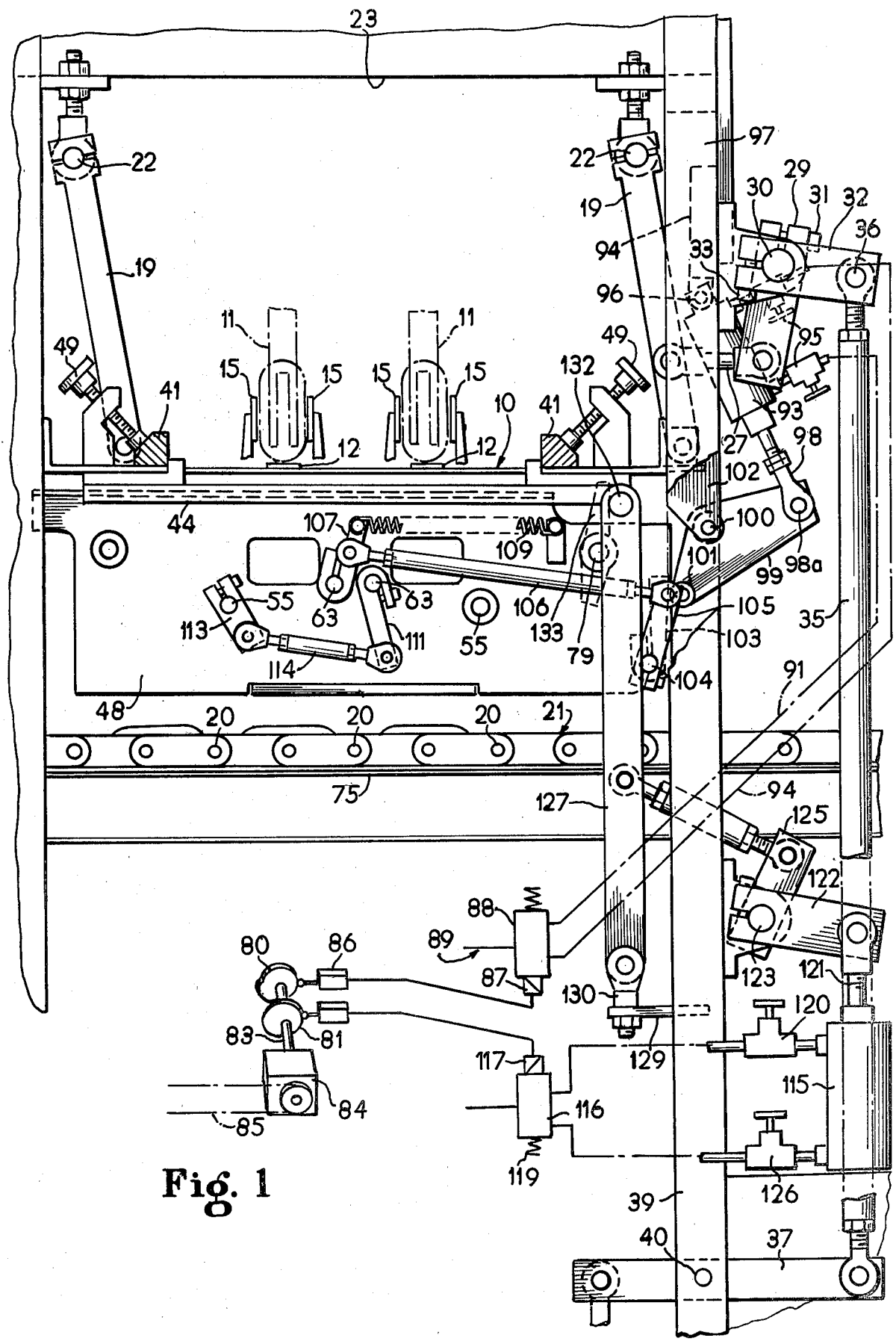
FIG. 1 is a transverse sectional view of the apparatus taken through the apparatus at the loading station showing the mechanism for actuating the drop gates and the orienting drop chutes, through the loading station, showing certain details of the operating mechanism for the orienting chutes, not shown in FIG. 1.

In the embodiment of the invention illustrated in the drawings, I have shown a drop station 10 for counted groups of elongated bakery products, such as sandwiched finger cookies or like products. The cookies are counted and grouped and conveyed to the drop station 10 in a manner similar to that shown and described in U.S. Pat. No. 3,290,859 which issued to Richard C. Talbot and assigned to the assignee of the present invention and is incorporated herein as a part hereof so like parts will not be shown or described in detail.

Figure 3:
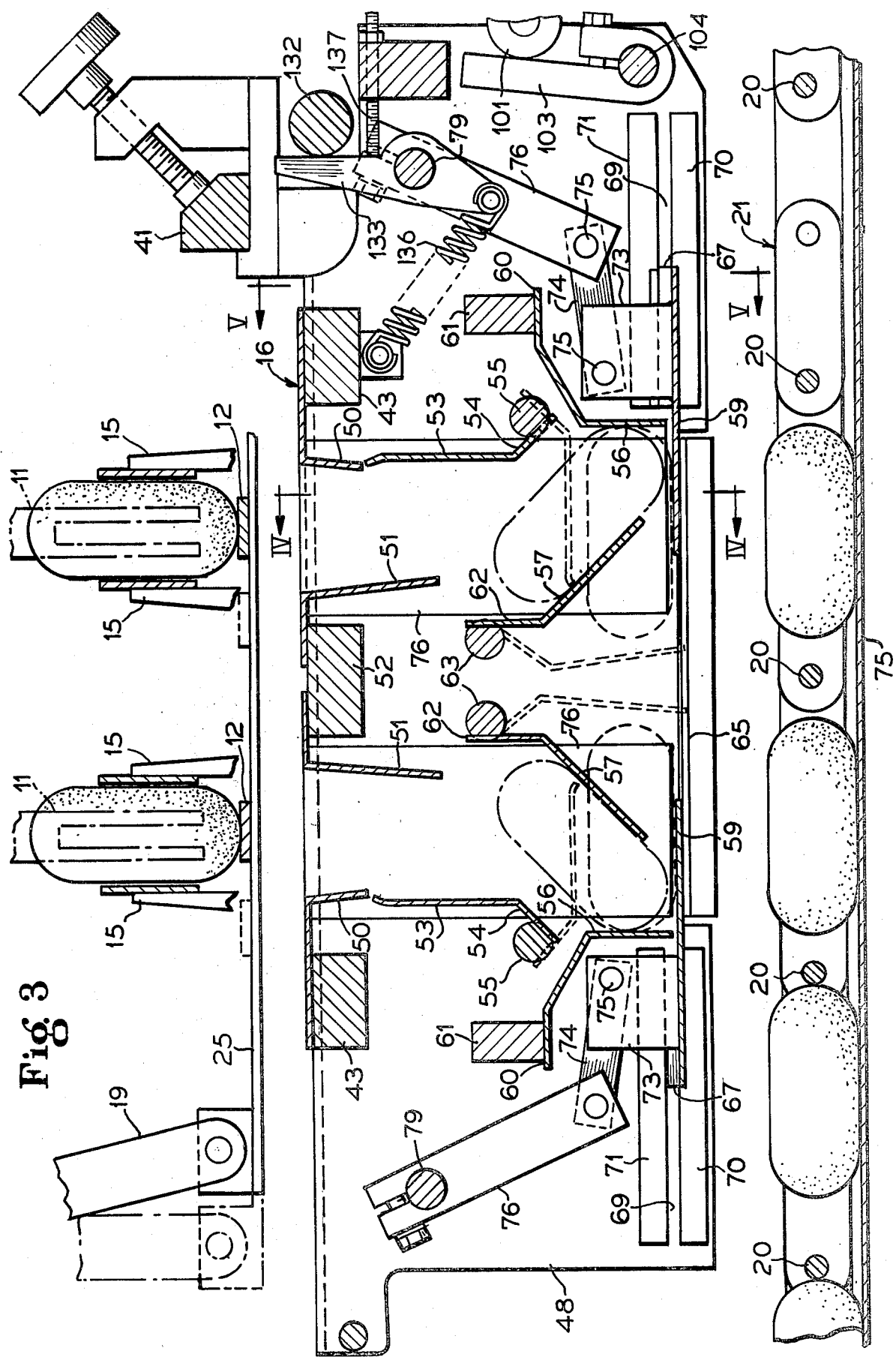
FIG. 3 is an enlarged transverse sectional view taken through the drop chute station and showing certain details of the drop chutes not shown in FIG. 1 and also illustrating the orientation of a group of cookies or other bakery articles from an upright to a flat condition and positioning the cookies in this condition for depositing onto a conveyor.

As shown in FIGS. 1 and 3, depending conveyor fingers 11 are intermittently driven to convey counted groups of cookies along drop gates 12 between side guide plates 15, engaging and guiding opposite sides of the upright counted groups to pass over orienting drop chute assemblies 16.

The orienting drop chutes 16 are of a length corresponding to the number of cookies on the drop gates 12 and converge to slightly toe the cookies in as dropped and have cooperating extensions movable to orient each group to positions ninety degrees from their positions on the drop gates.

The drop gates are shifted laterally by a linkage arrangement 19 in timed relation relative to dwells in travel of the conveyor fingers 11, to release side by side uniform groups of cookies to drop downwardly along the orienting drop chute assemblies 16, as the drop gates are moved out of supporting engagement with the groups of cookies, as in U.S. Pat. No. 3,290,859. The spacing between the rows of cookies is determined by space requirements for the conveyor elements, and is less than the space between flights 20 of a conveyor 21 carrying the oriented cookies for packaging.

Usually a pair of side by side drop gates, forming a continuation of the support rails for the cookie conveyor (not shown) is provided for the groups of cookies to move along the drop gates 12 to pass above and in alignment with said side by said drop chute assemblies 16.

In general, the linkage 19 includes longitudinally spaced links at opposite sides of the drop gates and suspended from their upper ends on pivot shafts 22 (FIG. 1) mounted on upper frame structures 23 of the main frame of the machine, to extend longitudinally of the machine along opposite sides thereof. The lower ends of the linkage are longitudinally pivoted to blocks 24 at the ends of parallel spaced transverse bars 25 forming supports for the drop gates 12 as in the aforementioned Talbot U.S. Pat. No. 3,290,859, so not herein shown or described further.

The drop gates 12 are swung laterally out of supporting engagement with the cookies, to effect dropping of each group of cookies into the drop chutes 16 by a suitable linkage arrangement operated on principles similar to those shown and described in the aforementioned patent to Talbot U.S. Pat. No. 3,290,859, but differing therefrom in minor details which include a link 27 pivoted to a swingable link of the linkage 19 at one end and pivoted at its opposite end to a rock arm 29 secured to a pivot shaft 30 at its upper end. The upper end of the rock arm 29 is split to accommodate clamping to said shaft 30 as by a machine screw 31 but may be keyed or otherwise secured thereto. A similar rock arm 32 has a split end and is clamped to the pivot shaft 30 as by a machine screw 33. A link 35 is pivoted to the outer end of the rock arm 32 as by a pivot pin 36. Said link 35 extends downwardly from the rock arm 32 along, but spaced outwardly from the main frame of the machine and is pivoted to a rocking arm 37, at its' lower end. Said rock arm 37 is pivoted intermediate its ends to an upright 39 of the main frame of the machine on a pivot shaft 40. The outer end of the rock arm 37 is actuated in sequenced timing to dwells in travel of the cookies by an activating arrangement similar to the arrangement described in U.S. Pat. No. 3,290,859, so not herein shown or described further.

Referring now in particular to the drop chutes and drop chute assembly 16 orienting the groups of finger cookies from their upright positions, to positions ninety degrees with respect to their upright positions. It should be understood that where two spaced groups of sandwiched finger cookies are conveyed along each of the drop gate support rails 12, a pair of drop chutes and orienting assemblies are provided for the two separate groups, although in some instances only one drop chute assembly need be provided as previously mentioned in U.S. Pat. No. 4,226,073.

The drop chute assembly is adjustably supported on parallel bars 41 at opposite sides of the main frame of the machine spaced above and extending parallel to drop gates 12, when in the positions shown in FIGS. 1 and 2, with each of the drop chutes 16 aligned with a row of cookies supplied along the drop gates 12.

A pair of transverse supports 44 extend across said bars and depend therefrom. The supports 44 each have a recessed slot 45 extending therealong, which receives and supports a flange 47 of one side plate 48 of the drop chute assembly. The flanges 47 may be slid into the slots 45 from the left hand side of the apparatus, as shown in FIGS. 4 and 5, and as clearly shown and described in U.S. Pat. No. 4,226,073. A pair of clamping screws 49 is provided to adjustably secure each support 44 in position across the spaced bars 41, in a manner well known to the art and stopped by abutment angles (not shown) abutting stop faces (not shown) at the right side of the apparatus as shown in U.S. Pat. No. 4,226,073.

Suitable clamping means carried on the supports 44 may hold the drop chute assembly in operative position as in U.S. Pat. No. 4,226,073 and to accommodate the removal and cleaning of the drop chute assembly, and the substitution of other assemblies where required.

Cross bars 43, 43 and 52 connect the side plates 48 together and form supports for the drop chute assemblies 16 (FIG. 3).

Each drop chute assembly includes upper outer chute walls 50, shown as being slightly inclined inwardly and having top horizontal legs or flanges extending across the outer parallel bars 43 and suitably secured thereto. Inner chute walls 51 are longer than the outer chute walls and converge toward the outer walls at slight angles and cooperate therewith to form in effect a hopper slightly towing the leading ends of the group of cookies outwardly.

An outer pivoted wall 53 forms a downward continuation of each chute wall 50 and has a slightly inwardly flared upper end portion spacing the body of the wall 53 a slight distance outwardly of the lower end of the wall 50. The wall 53 has an outwardly and downwardly inclined lower end portion 54 welded or otherwise secured to the underside of pivot shaft 55, pivoted to the side plates 48 of the drop chute assembly. Said pivot shaft 55 serves to pivot the wall 53 to the horizontal position shown in FIG. 3 to extend above the group of oriented cookies and retain the group of cookies in their oriented positions shown by dotted lines in FIG. 3. The pivot shaft 55 is actuated in timed relation relative to orienting of the cookies.

Beneath the pivoted wall 53 and spaced outwardly therefrom is a vertical wall 56, forming an abutment wall for the leading end of the group of cookies as oriented by an inner orienting wall 57, and laid flat on a retractible support plate 59 by said orienting wall.

The abutment wall 56 is stationary and has an angularly outwardly and upwardly extending portion terminating into a horizontal flange like portion 60, welded or otherwise secured to the bottom of a fixed rectangular bar 61, extending across and spacing the side plates 48 apart.

The orienting wall 57 is spaced beneath and inwardly of the chute wall 51 and in effect forms a terminal wall of the drop chutes. Said wall 57 has a generally vertically extending portion 62 welded or otherwise secured to a pivot shaft 63 at its upper end. Said shaft extends across the walls 48 of the drop chute assembly 16 parallel to the lines of travel of the groups of cookies.

The next adjacent drop chute for the second row of cookies is exactly the same as that just described, except the pivoted walls 53, orienting walls 57 and retractible plate 59 operate in opposite relation to those just described, to effect the deposit of the oriented groups of cookies between the flights 20 of the packaging conveyor 21.

The retractible plates 59 forming the bottoms of the drop chutes are slidably supported along the insides of opposed side walls 48 of the drop chute assembly 16. Gibs 67 extending upwardly of said plates adjacent their outer ends and are slidably guided in guide slots 69 formed by parallel vertically spaced plates 70 and 71, which may be riveted or otherwise secured to each side plate and extend inwardly therefrom.

Each retractible plate 59 may also have a pair of spaced ears 73 extending upwardly therefrom along the inside of the gibs 67. Links 74 are pivotably connected to said ears, as by pivot pins 75. Said links extend outwardly of said ears and are pivotally connected at their outer ends to cranks 76, serving to extend and retract said retractible plate 59, supporting a group of cookies as oriented, and allowing the cookies to drop onto a material carrying plate 75 of the conveyor 21, as shown in FIG. 3.

The ends of the drop chutes are closed by end walls 76 having outwardly flared upper end portions 77 (FIGS. 4 and 5).

The cranks 76 are operated by a transversely extending rock shaft 79. Said cranks 76 have split upper end portions and are clamped to said rock shaft as by machine screws 80 in a conventional manner.

Referring now to the operating means for the pivot or rocks shafts 55, 63 and 79 on each side of the center of the drop chute assembly, to swing the orienting walls 57 of each drop chute towards each other in a pre-selected sequence and then pivot the retainer walls 53 to hold the oriented groups of cookies to rest in positions at ninety degrees from their positions on the drop gates 12 and to then move the retractible plates 59 out of supporting engagement with the oriented groups of cookies to be deposited on the material carrying plate 75 of the conveyor 21, between the flights thereof, two timing cams 80 and 81 are provided (FIG. 1) as in U.S. Pat. No. 4,226,073.

The timing cams 80 and 81 are mounted on a shaft 83, driven by a drive member 84, which in turn is shown as driven from a motor (not shown), through a belt or chain drive 85. The timing cam 80 operates a microswitch 86 which controls the energization of a solenoid 87 of a fluid pressure valve 88. Said valve is a double acting valve and is supplied with fluid under pressure such as air, by a pressure line 89. Energization of the solenoid 87 moves said valve in one position to supply fluid under pressure through a pressure line 91 to a cylinder 93. The cylinder 93 is a double acting cylinder and is supplied with fluid under pressure at one end through the pressure line 91 and at its opposite end through a pressure line 94. Manually adjustable flow control valves 95 and 96 are provided in the pressure lines 91 and 94 to control the speed of operation of the orienting chutes. The cylinder 93 is pivoted adjacent its head end to a bracket 94 on a pivot pin 96. A piston rod 98 is extensible from the cylinder 93 and is pivoted to an actuating member 99 on a pivot pin 98a. Said actuating member is shown as being generally triangular in form and is pivoted intermediate its ends to a pivot pin 100 suitably mounted on a vertical leg 102 of a main frame of the machine.

The actuating lever 99 is generally triangular in form, the pivot pin 100 is adjacent an intermediate apex thereof and a roller 101 is at an opposite apex thereof. Said roller 101 engages a rock arm 103 clamped to a transverse shaft 104 extending across the side plates 48 and outwardly therefrom, for rocking said shaft in one direction. A lever arm 105 is also clamped to the shaft 104 and extends upwardly therefrom. A link 106 is connected between the upper end of the rocking arm 105 and a rock arm 107 intermediate the ends of said rock arm clamped to one shaft 63 for rocking said shaft in a counterclockwise direction to lower the trailing end of the group of finger cookies onto the retractible plate 59. A tension spring 109 biases the lever arm 103 into engagement with the roller 101.

The next adjacent shaft 63 is pivoted in an opposite direction from the shaft just mentioned, to move the orienting wall 57 to orient a group of finger cookies onto the retractible plate 59, by a rock arm 111, suitably clamped to said shaft and extending downwardly therefrom. A link 114 is pivoted to the lower end of said rock arm at one end and to a rock arm 113 at its opposite end. The rock arm 113 (FIG. 1) is suitably clamped to a transverse shaft 55 to move the retainer wall 53 to the generally horizontal position shown in dotted line in FIG. 3. The opposite retainer wall 53 is actuated by the rock arm 113 on the opposite side of the assembly 16 from that shown in FIG. 1, by the pivot shaft 55 extending across the drop chute assembly, and having a depending lever or rock arm 113 clamped thereto.

The opposite shaft 55 for the next adjacent drop or orienting chute is rocked from the solid line positions shown in FIGS. 1 and 3 to the dotted line position shown in FIG. 3 in opposite directions from which the first mentioned shaft is rocked, but from the opposite side of the drop chute structure, so the description thereof need not be repeated. It is, however, desired to point out that FIGS. 1 and 2 view the drop chute assemblies from opposite sides thereof and that in FIG. 1 the lever arm 105 is mounted on one end portion of the rock shaft 104 and rocked by pivotal movement of said shaft and extends upwardly therefrom and is connected to the rock arm 107 by a link 106 and moves the associated retainer wall 53 and orienting wall 57 in one direction.

In FIG. 2, the rock arm 105 is on the opposite end of the shaft 104 from the end shown in FIG. 1. The link 110 is connected to the lower end of the lever arm 112. This will effect rocking movement of the shafts 63 and 55 for each row of cookies in opposite directions and move the orienting walls 57 and retainer walls 53 for each row of finger cookies in opposite directions.

The retractible plates 59 are retractibly moved in opposite directions relative to each other by a fluid pressure cylinder 115 supplied with fluid under pressure such as air by a valve 116 actuated in one direction by a solenoid 117 controlled by the cam 81 and in an opposite direction by a spring 119 or like return device. Manually adjustable flow control valves 126 are shown as controlling the supply of fluid under pressure to either end of a valve 120. The cylinder 115 has a piston rod 121 extensible therefrom and pivoted to a rock arm 122, clamped to a shaft 123 for rocking said shaft in opposite directions. A rock arm 125 is clamped to said shaft and is pivotally connected to an upright arm 127 intermediate the ends of said arm.

The upright arm 127 is pivoted at its lower end to a bracket 129 on a clevis 130, extending upwardly of said bracket. The upper end of the arm 127 has a rod 132 mounted thereon and extending across the apparatus to a similar arm on the opposite side of the machine from that shown in FIG. 1. The rod 132 serves as an actuator to actuate a rock arm 133 pivoted between the side plates 48 of the drop gate assembly on a pivot shaft 79 extending across said side plates. Said rock arm extends downwardly of the shaft 79. A tension spring 136 is connected to a depending arm of the rock arm 133 and biases said rock arm into engagement with the rod 132.

The rock arm 133 engaging the rod 132 serves to pivot the shaft 79 to retract the plate 59. Movement of said rock arm in a return direction is limited by an adjustment screw 137 (FIG. 1). Spaced lever arms 76 are clamped or otherwise secured to the shaft 79 and rocked thereby. The lower ends of said lever arms, each have a link 74 pivoted thereto (FIG. 5) and pivotally connected to an associated ear 73 extending upwardly of the retractible plate 59, for retracting said plate at a relatively high rate of speed.

The opposite retractible plate 59 is operated from a transverse shaft 79 parallel and in the same plane as the shaft 79 through a rock arm 76 clamped to the opposite end of the shaft 79 from that just described. The operating connection includes a rock arm clamped to and depending from the shaft 79 and the link 138 pivoted to the lower end of said rock arm 76 and to a rock arm 146 clamped to and extending upwardly of the shaft 79.

The plates 59 thus move simultaneously in opposite directions at relatively high rates of speed to quickly drop the side by side oriented groups of cookies onto the material carrying plate 75 between the successive flights of the conveyor 21, as shown in FIGS. 1, 3 and 5.

It should be understood that the actuating connections for the operative parts of the apparatus are from opposite sides of the gate assembly to relieve the assembly the stresses that would otherwise occur if the actuating linkages were on one side only of the apparatus.

It should also be understood that the connections from the levers or rocking arms to their respective shafts are clamping connections to enable ready adjustment thereof to operate the orienting structure in the required sequence with the walls of one drop chute operating in opposite timed relation with respect to those of the other.

I claim as my invention:

1. In an apparatus for conveying and orienting elongated finger cookies or other bakery products in groups for packaging, at least one drop gate, conveying means for conveying counted groups of cookies along said drop gate with their longest dimensions extending vertically, a drop chute assembly extending beneath and in cookie receiving relation with respect to said drop gate, a retractible support plate in cookie receiving relation with respect to said drop gate, means moving said drop gate out of supporting engagement with a group of cookies to accommodate dropping of the group of cookies along said drop chute assembly, a cookie orienting extension at the lower end of said drop chute assembly for turning each counted group of cookies from an upright position to a flat position on said retractible support plate, said cookie orienting extension including a retractible orienting wall extending along one side of said drop chute assembly and angularly downwardly relative thereto, a stop wall at the opposite side of said drop chute assembly from said cookie orienting wall, and means for pivotally moving said cookie orienting wall out of supporting engagement with the cookies engaging said stop wall to accommodate the cookies on the cookie orienting wall and engaging said stop wall to be lowered onto said retractible plate upon movement of said cookie orienting wall in a direction away from said drop chute assembly to a position 90 degrees from their positions on said drop gate as said cookie orienting wall pivotally moves outwardly of said drop chute assembly.

2. The finger cookie orienting apparatus of claim 1 wherein a pivoted retainer wall extends downwardly of said drop chute assembly and is pivoted at its lower end to move in an opposite direction from said orienting wall and means are provided for moving the retainer wall along the tops of the oriented cookies on said retractible plate to retain the cookies to said plate.

3. The cookie orienting apparatus of claim 2 including means for pivotally moving said orienting wall and said retainer wall in opposite directions in a predetermined sequence and in timed relation with respect to movement of said drop gates out of supporting engagement with the groups of finger cookies thereon.

4. The apparatus of claim 3 wherein link and lever means are provided for pivoting said cookie orienting wall from one side of said drop chute assembly, and other link and lever means are provided at the opposite side of said drop chute assembly to pivotally move said retainer wall into said drop chute assembly in an opposite direction from pivotal movement of said orienting wall.

5. The apparatus of claim 4 wherein said retractible plate is reversely moved in supporting and release positions, and link and lever means are provided to move said retractible plate reversely of movement of said orienting wall.

6. The apparatus of claim 5 wherein including a conveyor disposed beneath said drop chute assembly and having a bottom plate extending parallel to said retractable plate.

7. The cookie orienting apparatus of claim 1 including two drop gates in side-by-side relation with respect to each other, the conveying means includes individual conveyors for each drop gate, conveying counted groups of cookies along said drop gates with their longest dimensions extending vertically, a drop chute assembly for each drop gate and disposed thereneath in cookie receiving relation with respect to said drop gates as said drop gates are moved out of supporting engagement with the cookies, wherein, the cookie orienting extensions of said drop chute assemblies include an orienting wall for each drop chute pivoted at its upper end and extending angularly across said drop chute in a downward direction and supporting groups of finger cookies thereon in angular relation with respect to said drop gates, the means for pivoting said cookie orienting walls includes link and lever means, retainer walls at the opposite side of said drop chute assembly from said orienting walls and link and lever means at each side of said drop chute assembly and moving said orienting and retainer walls in opposite directions.

8. The finger cookie orienting apparatus of claim 7 wherein the abutment walls are provided for each drop chute assembly and form abutments about which the finger cookies pivot upon withdrawal of said orienting walls, to generally horizontal positions on said retractible plates.

9. The apparatus of claim 1 including conveyor means beneath said retractible plate, having a bottom plate, spaced conveyor chains movable along said bottom plate, flights between said chains and spaced apart a greater distance than the length of said cookies as oriented, means driving said conveyor chains, and link and lever means coordinated with movement of said orienting and retainer walls for moving said retractible plates to drop a group of cookies between the flights of said conveyor means, and back into position to support an oriented group of cookies upon retractible movement of said orienting walls.

10. In a process for orienting bakery products such as finger cookies and the like, into position for packaging in counted groups, in which conveyor means convey the counted groups of cookies along drop gates, and drop chutes are provided in cookie receiving relation with respect to said drop gates and receive counted groups of cookies as said drop gates are moved out of supporting engagement with the cookies, with the longest dimension of each cookie of the group extending vertically; the steps of orienting the groups of cookies from their positions delivered from said drop gates by dropping the cookies onto an inclined support wall forming a lower continuation of each drop chute and into abutting engagement with a stop wall forming a lower continuation of an opposite wall of each drop chute, providing a generally horizontal support wall for supporting discharged cookies at 90° with respect to their positions on said orienting wall, then retracting said orienting wall and accommodating a group of cookies to pivot about said stop wall as said orienting wall is withdrawn.

11. The orienting process of claim 10 including a provision of retainer wall opposite from the support wall and moving the retainer wall to extend over the group of cookies as oriented as the inclined wall is moved out of the supporting engagement with the group of cookies dropped thereon.

12. The orienting process for bakery products of claim 10 in which an abutment wall is on the opposite side of the drop chute from said inclined support wall, the steps of moving said inclined support wall out of supporting engagement with a group of cookies dropped thereon, to pivot about said stop wall and drop onto said retractible wall, then retracting said orienting wall and retaining the group of cookies in their oriented positions as said orienting wall is retracted and said support wall is moved out of supporting engagement with the oriented group of cookies, to be carried away for packaging.

* * * * *